(12) United States Patent
O'Quin

(10) Patent No.: US 6,488,292 B2
(45) Date of Patent: Dec. 3, 2002

(54) SHOPPING CART HAVING GATE-GUIDING LEDGES

(75) Inventor: Taft O'Quin, Inola, OK (US)

(73) Assignee: Unarco Industries, Inc., Wagoner, OK (US)

( * ) Notice: Subject to any disclaimer, the term of this patent is extended or adjusted under 35 U.S.C. 154(b) by 0 days.

(21) Appl. No.: 09/730,082

(22) Filed: Dec. 5, 2000

(65) Prior Publication Data

US 2002/0140188 A1 Oct. 3, 2002

(51) Int. Cl.$^7$ ................................................. B62B 3/14
(52) U.S. Cl. ........................... 280/33.991; 280/33.992; 280/DIG. 4
(58) Field of Search ....................... 280/33.991, 33.992, 280/33.993, 33.995, DIG. 4; 224/411

(56) References Cited

U.S. PATENT DOCUMENTS

| | | | |
|---|---|---|---|
| 3,717,358 A | * 2/1973 | Mills | 280/33.991 |
| 5,255,930 A | 10/1993 | Jones et al. | |
| 5,505,472 A | * 4/1996 | Trubiano | 280/33.993 |
| 5,865,448 A | 2/1999 | Kern et al. | |
| 6,155,580 A | * 12/2000 | Symons | 280/33.991 |

* cited by examiner

Primary Examiner—Brian L. Johnson
Assistant Examiner—Christopher Bottorff
(74) Attorney, Agent, or Firm—Woods, Phillips, Katz, Clark & Mortimer

(57) ABSTRACT

A shopping cart, which is nestable with a similar cart preceding it for storage, comprises a wheeled chassis, a handle structure, a basket having a front wall, a bottom wall, and two side walls, and a rear gate mounted so as to be pivotable. When the basket of the shopping cart is pushed into the basket of the preceding cart, the rear gate of the preceding cart is pivoted into an elevated position. In the elevated position, unless the rear gate of the preceding cart rests on the upper edges of both side walls of the basket being pushed thereinto, the rear gate of the preceding cart rests on the upper edge of one side wall of the basket being pushed thereinto but one corner of the rear gate of the preceding cart, near the side wall that is opposite, can drop into the basket of the shopping cart. Each side wall of the basket of the shopping cart has a ledge, which projects laterally into the basket from such side wall and which has an inclined surface adapted to engage such a corner dropping into the basket of the shopping cart and to guide the engaged corner upwardly along the inclined surface as the basket of the shopping cart is pulled from the basket of the preceding cart. In a preferred embodiment, the front, bottom, and side walls of the basket of the shopping cart are molded from a polymeric material and the inclined ledge projecting from each side wall is molded unitarily with such side wall.

5 Claims, 2 Drawing Sheets

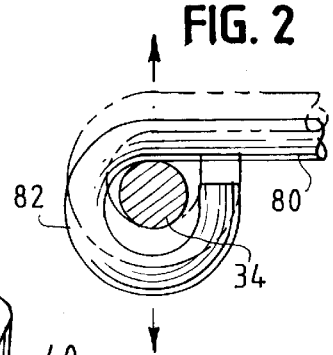
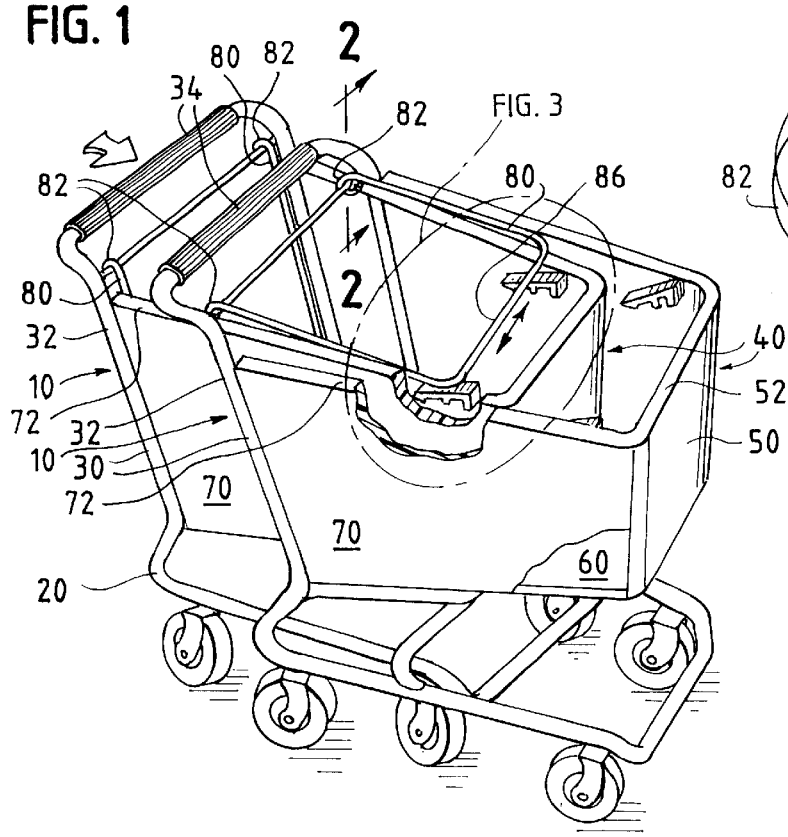
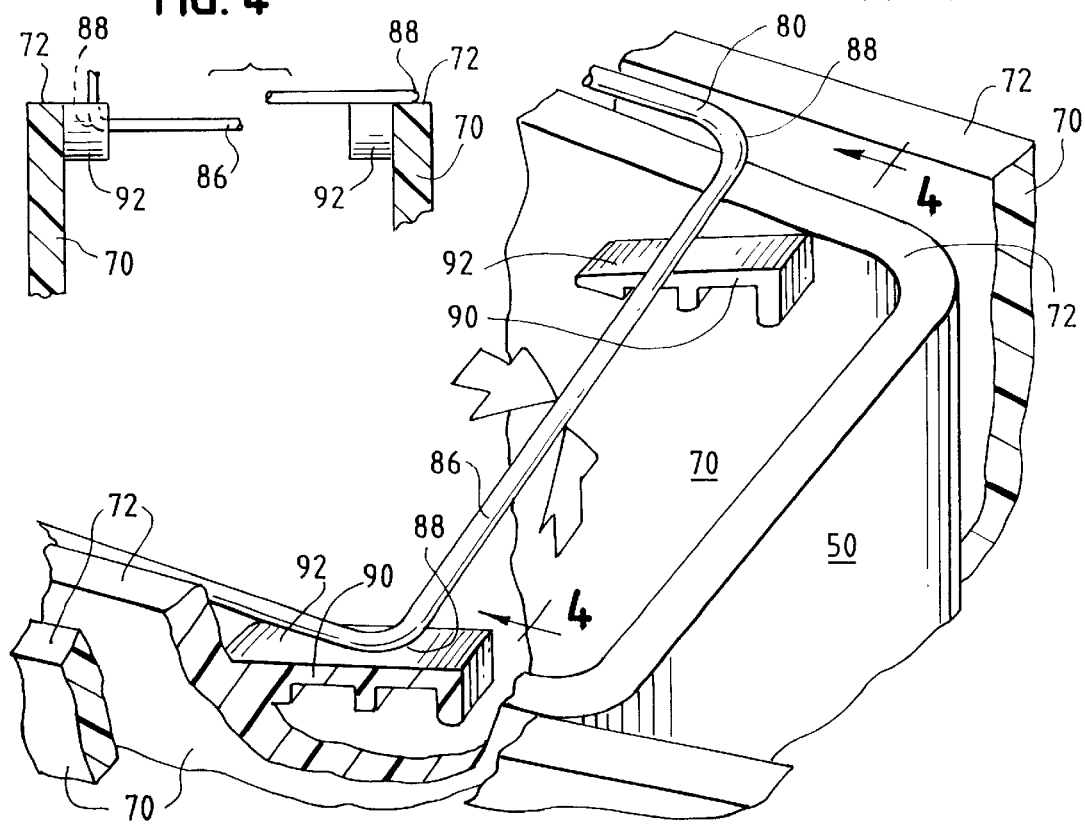

SHOPPING CART HAVING GATE-GUIDING LEDGES

FIELD OF THE INVENTION

This invention pertains to a shopping cart of a type that is nestable with a similar cart preceding the shopping cart. This invention addresses a problem that can arise if one corner of a rear gate of the preceding cart drops into a basket of the shopping cart.

BACKGROUND OF THE INVENTION

Typically, a shopping cart of the type noted above comprises a wheeled chassis, a handle structure fastened to the wheeled chassis, and a basket fastened to the wheeled chassis and to the handle structure. Typically, the basket has a front wall having an upper edge, a bottom wall, and two side walls, the front wall having an upper edge and each side wall having an upper edge.

As exemplified in U.S. Pat. No. 5,255,930, the disclosure of which is incorporated herein by reference, the front, bottom, and side walls of the basket are molded from a polymeric material, in separate pieces, which are assembled. Alternatively, the front, bottom, and side walls of the basket are molded from a polymeric material unitarily or are fabricated from welded wires.

Typically, a shopping cart of the type noted above comprises a rear gate, which either is molded from a polymeric material or is fabricated from welded wires. The rear gate is mounted to the handle structure so as to be pivotable, generally about a horizontal axis, downwardly toward and upwardly away from a rest position, in which the rear gate defines a rear wall of the basket.

Typically, when nested for storage, the basket of the shopping cart is adapted to engage the rear gate of a similar cart preceding the shopping cart, at the upper edge of the front wall of the basket of the shopping cart, when the basket of the shopping cart is pushed into the basket of the preceding cart, so as to pivot the rear gate of the preceding cart upwardly from the rest position into an elevated position, in which the rear gate of the preceding cart rests either on the upper edge of just one of the side walls of the basket of the shopping cart or on the upper edges of both of the side walls of the basket of the shopping cart.

In the elevated position, unless the rear gate of the preceding cart rests on the upper edges of both of the side walls of the shopping cart, the rear gate of the preceding cart can tilt so that one corner of the rear gate of the preceding cart can drop into the basket of the shopping cart, near the side wall opposite to the side wall whereon the rear gate of the preceding cart rests. Thus, a problem arises, which is that the dropped corner into the basket of the shopping cart can engage the front wall of the basket of the shopping cart, so as to interfere with pulling of the basket of the shopping cart from the basket of the preceding cart, whereby the shopping cart cannot be easily unnested from the preceding cart.

Whether the rear gate rests on the upper edge of just one of the side walls of the basket of the shopping cart or on the upper edges of both of the side walls of the basket of the shopping cart depends upon several factors, which include the configurations, proportions, and dimensions of the respective baskets, whether the rear gate of the preceding cart is mounted loosely, and whether the basket of the shopping cart is centered with respect to the basket of the preceding cart when pushed into the basket of the preceding cart.

In U.S. Pat. No. 5,865,448 a shopping cart of related interest is disclosed, in which the side walls of the basket have molded projections to prevent the rear gate of a preceding cart from dropping into the basket.

SUMMARY OF THE INVENTION

As provided by this invention, in a shopping cart of the type noted above, each side wall of the basket has a ledge, which projects laterally into the basket from said side wall. The ledge has an inclined surface, which is adapted to engage such a corner dropped into the basket and to guide the dropped corner upwardly along the inclined surface as the basket of the shopping cart is pulled from the basket of the preceding cart. It does not matter whether the corner drops onto the inclined surface or behind the ledge having the inclined surface, in a rearward sense, so long as the inclined surface can guide the dropped corner as mentioned. From a more generalized viewpoint, at least one of the side walls of the basket has such a ledge.

Preferably, the front, bottom, and side walls of the basket of the shopping cart are molded from a polymeric material, either in separate pieces as disclosed in U.S. Pat. No. 5,255,930, supra, or unitarily. Alternatively, the front, bottom, and side walls of the basket of the shopping cart are fabricated from welded wires, which are used commonly in shopping cart construction. The rear gate may be similarly made, either molded from a polymeric material or fabricated from welded wires. Usually, a rear gate molded from a polymeric material is heavier, as compared to a rear gate fabricated from welded wires, so as to exacerbate the problem discussed above.

BRIEF DESCRIPTION OF THE DRAWINGS

FIG. 1 is a perspective view of two shopping carts embodying this invention, in a nested array, in which a first cart is nested with a second cart so that the basket of the first cart is pushed into the basket of the second cart. Reflecting their order in the nested array, it is convenient to refer to the first cart as the following cart and to the second cart as the preceding cart.

FIG. 2 is a fragmentary, sectional view taken along line 2—2 indicated in FIG. 1, in a direction indicated by arrows, to show how the rear gate of the preceding cart is mounted loosely to a transverse bar of the handle structure of the preceding cart so as to be pivotable. FIG. 2 shows the rear gate of the preceding cart as pivoted from its rest position to an elevated position.

FIG. 3 is an enlarged detail taken within a region outlined by a dashed line in FIG. 1. The enlarged detail shows two ledges, one on each side wall of the basket of the following cart, and the rear gate of the preceding cart.

FIG. 4 is a fragmentary, sectional view taken along line 4—4 indicated in FIG. 3, in a direction indicated by arrows, to show the ledges shown in FIG. 3 and the rear gate shown in FIG. 3, from a different vantage.

Figure 5:
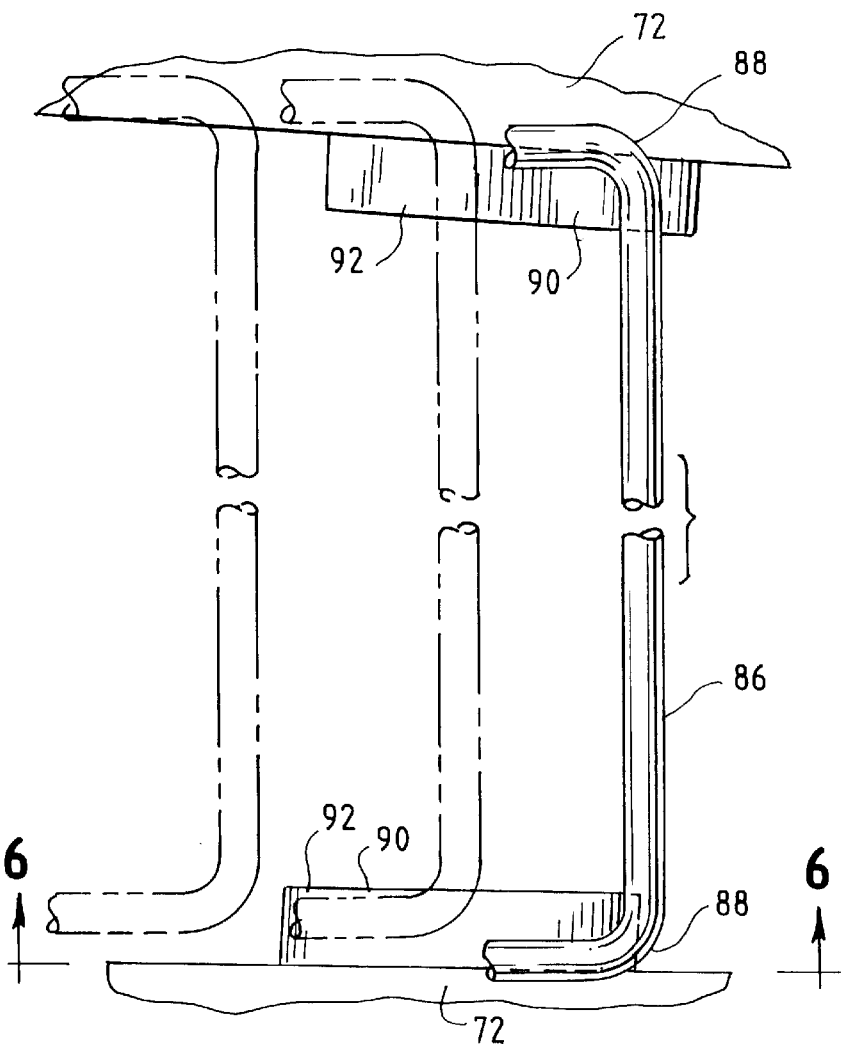
FIG. 5 is a fragmentary, plan view showing relative positions of the ledges shown in FIG. 3 and the rear gate shown in FIG. 3, at successive intervals as the basket of the following cart is pulled from the preceding cart.

In the drawings, the front, bottom, and side walls of the baskets of the shopping carts and the rear gates of the shopping carts are simplified, so as to omit details outside the scope of this invention and so as to facilitate understanding of this invention.

DETAILED DESCRIPTION OF THE ILLUSTRATED EMBODIMENTS

As shown, each shopping cart 10 comprises a wheeled chassis 20, a handle structure 30 fastened to the wheeled chassis 20, and a basket 40 fastened to the wheeled chassis 20 and to the handle structure 30. The handle structure 30 comprises two handle uprights 32 and a transverse bar 34, which extends between the handle uprights 32. The basket 40 has a front wall 50 having an upper edge 52, a bottom wall 60, and two side walls 70 opposite to each other, each having an upper edge 72. As shown, the front, bottom, and side walls of the basket 40 of each shopping cart 10 are molded from a polymeric material, either in separate pieces as disclosed in U.S. Pat. No. 5,255,930, supra, or unitarily.

As shown, each shopping cart 10 comprises a rear gate 80, which is mounted to the handle structure 30, via two wire loops 82 extending from the rear gate 80 and wrapped loosely around the transverse bar 34, so as to be pivotable near an upper edge 84 of the rear gate 80, generally about a horizontal axis, downwardly toward and upwardly away from a rest position, in which the rear gate 80 defines a rear wall of the basket 40. At a lower edge 86, the rear gate 80 has two corners 88 opposite to each other.

The basket 40 of the following cart 10 is adapted to engage the rear gate 80 of the preceding cart 10, at the upper edge 52 of the front wall 50 of the basket 40 of the following cart 10, when the basket 40 of the following cart 10 is pushed into the basket 40 of the preceding cart 10, so as to pivot the rear gate 80 of the preceding cart upwardly from its rest position into an elevated position.

In its elevated position, the rear gate 80 of the preceding cart 10 rests either on the upper edge 72 of just one of the side walls 70 of the basket of the following cart 10, as shown in FIGS. 3 through 6, or on the upper edges 72 of both of the side walls 70 of the basket 40 of the following cart 10. Whether the rear gate 80 of the preceding cart 10 rests on the upper edge 72 of just one of the side walls 70 of the basket 40 of the following cart 10 or on the upper edges 72 of both of the side walls 70 of the basket 40 of the following cart 10 depends upon several factors discussed hereinbefore.

In its elevated position, unless the rear gate 80 of the preceding cart 10 rests on the upper edges 72 of both of the side walls 70 of the basket 40 of the following cart 10, the rear gate 80 of the preceding cart 10 can tilt so that one of the corners 88 at the lower edge 86 of the rear gate 80 of the preceding cart 10 can drop into the basket 40 of the following cart 10, as permitted by the wire loops 82 wrapped loosely around the transverse bar 32 of the handle structure 30 of the preceding cart 10. The dropped corner 88 can engage the front wall 50 of the basket 40 of the following cart 10, so as to interfere with pulling of the basket 40 of the following cart 10 from the basket 40 of the preceding cart 10, whereby the following cart 10 cannot be easily unnested from the preceding cart 10.

Figure 6:
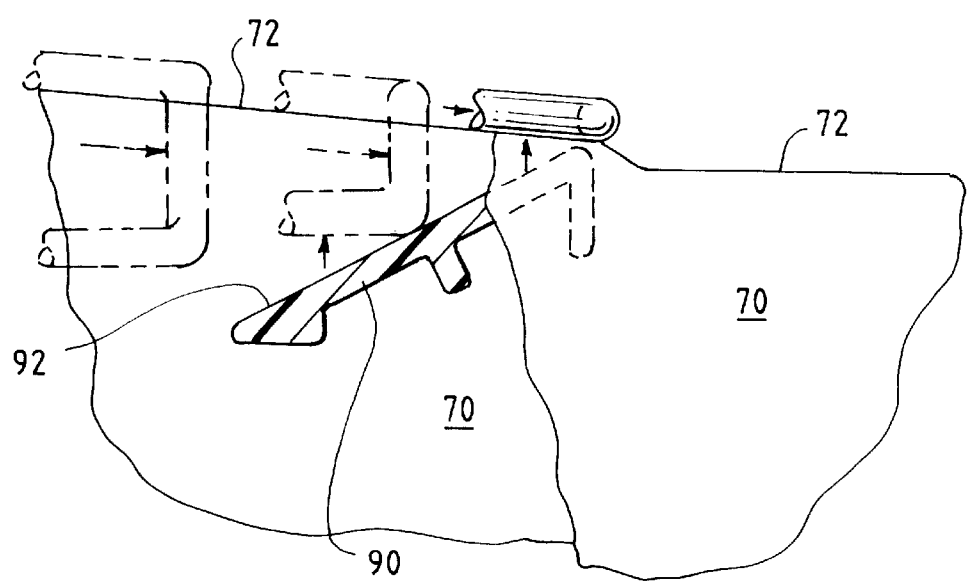
FIG. 6 is a fragmentary, sectional view taken along line 6—6 indicated in FIG. 5, in a direction indicated by arrows, to show the ledges shown in FIG. 3 and the rear gate shown in FIG. 3, at similar intervals.

As provided by this invention, each side wall 70 of the basket 40 of each shopping cart 10 has a ledge 90, which projects laterally into the basket 40 of said shopping cart 10 from said side wall 70. As shown, the ledge 90 is molded unitarily with said side wall 70. The ledge 90 has an inclined surface 92, which faces upwardly and rearwardly and which is adapted to engage such a corner 88 dropped into the basket 40 of said shopping cart 10 and to guide the engaged corner 88 upwardly, as shown in FIGS. 5 and 6, as the basket 40 of said shopping cart 10 is pulled from the basket 40 of a similar cart 10 preceding said shopping cart 10, whereby said shopping cart 10 can be easily unnested from the similar cart 10 preceding said shopping cart 10. It does not matter whether the corner 88 drops onto the inclined surface 92, as shown in FIG. 1, or behind the ledge 90 having the inclined surface 90, in a rearward sense, so long as the inclined surface 90 can guide the dropped corner 88 as mentioned.

What is claimed is:

1. A shopping cart, which is nestable with a similar cart preceding the shopping cart, the shopping cart comprising a wheeled chassis, a handle structure fastened to the wheeled chassis, and a basket fastened to the wheeled chassis and to the handle structure, the basket having a front wall, a bottom wall, and two side walls opposite to each other, the front wall having an upper edge and each side wall having an upper edge, and a rear gate mounted to the handle structure so as to be pivotable at or near an upper edge of the rear gate, generally about a horizontal axis, downwardly toward and upwardly away from a rest position, in which the rear gate defines a rear wall of the basket, wherein the basket of the shopping cart is adapted to engage the rear gate of a similar cart preceding the shopping cart, at the upper edge of the front wall of the basket of the shopping cart, when the basket of the shopping cart is pushed into the basket of the preceding cart, so as to pivot the rear gate of the preceding cart upwardly from the rest position into an elevated position, in which the rear gate of the preceding cart rests either on the upper edge of just one of the side walls of the basket of the shopping cart or on the upper edges of both of the side walls of the basket of the shopping cart, and in which, unless the rear gate of the preceding cart rests on the upper edges of both of the side walls of the basket of the shopping cart, one corner of the rear gate of the preceding cart can drop into the basket of the shopping cart, near the side wall opposite to the side wall having the upper edge whereon the rear gate of the preceding cart rests, wherein each side wall of the basket of the shopping cart has a ledge, which projects laterally into the basket of the shopping cart from said side wall and which has an inclined surface facing upwardly and rearwardly, the inclined surface constituting means for permitting such a corner to drop into the basket of the shopping cart, for engaging such a corner dropping into the basket of the shopping cart, and for guiding the engaged corner upwardly along the inclined surface as the basket of the shopping cart is pulled from the basket of the preceding cart.

2. The shopping cart of claim 1 wherein the front, bottom, and side walls of the basket of the shopping cart are molded from a polymeric material.

3. The shopping cart of claim 2 wherein the inclined ledge projecting from each side wall of the basket of the shopping cart is molded from a polymeric material.

4. The shopping cart of claim 3 wherein the inclined ledge projecting from each side wall of the basket of the shopping cart is molded unitarily with said side wall.

5. A shopping cart, which is nestable with a similar cart preceding the shopping cart, the shopping cart comprising a wheeled chassis, a handle structure fastened to the wheeled chassis, and a basket fastened to the wheeled chassis and to the handle structure, the basket having a front wall, a bottom wall, and two side walls opposite to each other, the front wall having an upper edge and each side wall having an upper edge, and a rear gate mounted to the handle structure so as to be pivotable at or near an upper edge of the rear gate, generally about a horizontal axis, downwardly toward and upwardly away from a rest position, in which the rear gate defines a rear wall of the basket, wherein the basket of the shopping cart is adapted to engage the rear gate of a similar cart preceding the shopping cart, at the upper edge of the front wall of the basket of the shopping cart, when the basket of the shopping cart is pushed into the basket of the preceding cart, so as to pivot the rear gate of the preceding cart upwardly from the rest position into an elevated position, in which the rear gate of the preceding cart rests either on the upper edge of just one of the side walls of the basket of the shopping cart or on the upper edges of both of the side walls of the basket of the shopping cart, and in which, unless the rear gate of the preceding cart rests on the upper edges of both of the side walls of the basket of the shopping cart, one corner of the rear gate of the preceding cart can drop into the basket of the shopping cart, near the side wall opposite to the side wall having the upper edge whereon the rear gate of the preceding cart rests, wherein at least one of the side walls of the basket of the shopping cart has a ledge, which projects laterally into the basket of the shopping cart from the same one of the side walls and which has an inclined surface facing upwardly and rearwardly, the inclined surface constituting means for permitting such a corner to drop into the basket of the shopping cart, for engaging such a corner dropping into the basket of the shopping cart, and for guiding the engaged corner upwardly along the inclined surface as the basket of the shopping cart is pulled from the basket of the preceding cart.

* * * * *